United States Patent
Burra et al.

(10) Patent No.: US 9,677,540 B2
(45) Date of Patent: Jun. 13, 2017

(54) SYSTEM AND METHOD FOR PROVIDING YAW BACKUP TO A WIND FARM

(71) Applicant: General Electric Company, Schenectady, NY (US)

(72) Inventors: Rajni Kant Burra, Karnataka (IN); Govardhan Ganireddy, Karnataka (IN); Victor Robert Abate, Saratoga Springs, NY (US); Keith Andrew Longtin, Singerlands, NY (US); Herman Lucas Norbert Wiegman, Niskayuna, NY (US); Robert William Delmerico, Clifton Park, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 122 days.

(21) Appl. No.: 14/073,892

(22) Filed: Nov. 7, 2013

(65) Prior Publication Data
US 2014/0145439 A1  May 29, 2014

(30) Foreign Application Priority Data
Nov. 29, 2012 (IN) .......................... 4992/CHE/2012

(51) Int. Cl.
F03D 7/02 (2006.01)

(52) U.S. Cl.
CPC ...... *F03D 7/0204* (2013.01); *F05B 2260/845* (2013.01); *F05B 2270/107* (2013.01);
(Continued)

(58) Field of Classification Search
CPC .............. F03D 7/0204; F05B 2260/845; F05B 2270/107; F05B 2270/321; F05B 2270/337; Y02E 10/723
See application file for complete search history.

(56) References Cited

U.S. PATENT DOCUMENTS 7,035,758 B1 * 4/2006 Jerome ................... B66C 13/04
                                                   702/150
7,355,294 B2   4/2008 Teichmann
(Continued)

FOREIGN PATENT DOCUMENTS

EP        1752659 A2   2/2007
WO    2010127885 A2  11/2010
(Continued)

*Primary Examiner* — Tulsidas C Patel
*Assistant Examiner* — S. Mikailoff
(74) *Attorney, Agent, or Firm* — GE Global Patent Operation; Douglas D. Zhang

(57) ABSTRACT

A yaw backup system is provided. The yaw backup system includes an energy storage medium for storing auxiliary power. The yaw backup system also includes a yaw controller for coordinating delivery of power from the energy storage medium to a yaw motor for controlling a yaw angle of a wind turbine during grid loss conditions. The yaw controller executes the steps of receiving wind direction signals over time from a sensor, altering a tolerance level of a wind turbine based on changes in the wind direction signals over time and controlling delivery of power to the yaw motor from the auxiliary power of the energy storage medium based on the tolerance level to control the yaw angle for reducing a load on the wind turbine induced by wind.

13 Claims, 6 Drawing Sheets

(52) U.S. Cl.
CPC ... *F05B 2270/321* (2013.01); *F05B 2270/337* (2013.01); *Y02E 10/723* (2013.01)

(56) References Cited

U.S. PATENT DOCUMENTS

| | | |
|---|---|---|
| 7,436,083 B2 * | 10/2008 | Shibata et al. .................. 290/44 |
| 7,719,128 B2 | 5/2010 | Kammer et al. |
| 7,740,448 B2 | 6/2010 | Meyer et al. |
| 8,008,794 B2 | 8/2011 | Edenfeld |
| 8,084,874 B2 | 12/2011 | Llorente |
| 8,154,142 B2 | 4/2012 | Nies |
| 2004/0100229 A1 | 5/2004 | Wobben |
| 2007/0001461 A1 * | 1/2007 | Hopewell ........................ 290/44 |
| 2007/0024227 A1 | 2/2007 | Kunkel et al. |
| 2007/0267873 A1 * | 11/2007 | Teichmann .................... 290/44 |
| 2010/0237617 A1 * | 9/2010 | Vyas ...................... F03D 7/043 |
| | | 290/44 |
| 2011/0175355 A1 * | 7/2011 | Rosenvard ...................... 290/44 |
| 2011/0193345 A1 | 8/2011 | Arinaga et al. |
| 2012/0056425 A1 | 3/2012 | Cousineau |
| 2012/0217748 A1 * | 8/2012 | Gjerlov et al. ................. 290/44 |
| 2013/0020804 A1 * | 1/2013 | Roesmann ............. F03B 15/00 |
| | | 290/44 |
| 2013/0307277 A1 * | 11/2013 | Rosenvard ...................... 290/55 |
| 2014/0203563 A1 * | 7/2014 | Bowyer ................ F03D 7/0284 |
| | | 290/44 |

FOREIGN PATENT DOCUMENTS

| WO | 2011035788 A2 | 3/2011 |
|---|---|---|
| WO | 2011076295 A2 | 6/2011 |

* cited by examiner

SYSTEM AND METHOD FOR PROVIDING YAW BACKUP TO A WIND FARM

BACKGROUND

The invention generally relates to wind turbines and, more particularly, to a system and method for providing yaw backup to the wind turbines in a wind farm.

Wind turbines are used to generate power by harnessing the wind energy present in the environment. As wind energy is a natural resource, the variations in the wind speed and the wind direction are uncontrollable and induce undesirable loads in the wind turbines. Therefore, a wind turbine includes various wind turbine components such as yaw and pitch motors for minimizing such undesirable loads. Under normal operating conditions, these wind turbine components operate based on power received from the wind turbine or a power grid coupled to the wind turbine.

In some situations where the wind turbines receive information about wind speeds or other conditions that may cause normal operation to be impossible, the wind turbines may suspend their operations and be disconnected from the grid. In such situations, if the wind turbine components do not receive power from the wind turbine or the power grid, wind turbine component operations may be suspended and damage to the wind turbines may result. To avoid the temporary suspension of operation of the wind turbine components, various approaches have been used to provide power to the wind turbine components during the time interval when the operations of the wind turbines are suspended.

Energy storage mediums have been used for providing power to the wind turbine components. However, conventional systems including energy storage mediums provide power to the wind turbine components based on a static mode of operation which may be ineffective in controlling loads induced in the wind turbines by the rapid changes in the wind speed and wind direction. Moreover, the operation of the conventional system leads to early depletion of the stored energy and thus requires large energy storage mediums.

Hence, there is a need for an improved system to address the aforementioned issues.

BRIEF DESCRIPTION

Briefly, in accordance with one embodiment, a yaw backup system is provided. The yaw backup system includes an energy storage medium for storing auxiliary power. The yaw backup system also includes a yaw controller for coordinating delivery of power from the energy storage medium to a yaw motor for reducing the yaw misalignment with the wind direction during grid loss conditions. The yaw controller executes the steps of receiving wind direction signals over time from a sensor, altering a tolerance level of a wind turbine based on changes in the wind direction signals over time, and controlling delivery of power to the yaw motor from the auxiliary power of the energy storage medium based on the tolerance level to control the yaw angle for reducing a load on the wind turbine induced by wind.

In another embodiment, a wind farm including a yaw backup system is provided. The wind farm includes wind turbines for generating wind power and transmitting the wind power to a power grid, where the wind turbines are electrically coupled to each other. The wind farm also includes yaw backup systems coupled to respective wind turbines in the wind farm for controlling delivery of power to a yaw motor to control a yaw angle of the respective wind turbines during a grid loss condition wherein each of the yaw backup system includes an energy storage medium for storing auxiliary power. The yaw backup system also includes a yaw controller that receives wind direction signals over time from a sensor, alters a tolerance level of the respective wind turbine based on changes in the wind direction signals over time, computes an auxiliary power level of the energy storage element coupled to the respective wind turbine, compares the computed auxiliary power level with a predefined auxiliary power level of the energy storage element coupled to the respective wind turbine, and controls the delivery of power to the respective yaw motor for controlling the yaw angle of the respective wind turbines based on the tolerance level for reducing a load on the wind turbine induced by wind. The yaw controller controls the delivery of power from the energy storage element of the respective wind turbine if the computed auxiliary power level of the energy storage medium coupled to the respective wind turbine is greater than the predefined auxiliary power level or from the energy storage element of a different wind turbine coupled to the respective wind turbine if the computed auxiliary power level of the energy storage medium coupled to the respective wind turbine is less than the predefined auxiliary power level based on the tolerance level to control the yaw angle.

In yet another embodiment, a method for providing yaw backup to the wind turbines in a wind farm is provided. The method includes receiving wind direction signals over time from a sensor. The method also includes altering a tolerance level of a wind turbine based on changes in the wind direction signals over time. The method further includes controlling delivery of power to a yaw motor of the wind turbine from an energy storage medium for controlling a yaw angle of the wind turbine based on the tolerance level to reduce a load condition in the wind turbine induced by wind.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include a yaw backup system that includes an energy storage medium for storing auxiliary power and a yaw controller for coordinating delivery of power from the energy storage medium to a yaw motor during grid loss conditions and for controlling a yaw angle of a wind turbine. The yaw controller receives wind direction signals over time from a sensor and alters a tolerance level of a wind turbine based on changes in the wind direction signals over time. The yaw controller controls the delivery of power to the yaw motor from the auxiliary power of the energy storage medium based on the tolerance level to control the yaw angle for reducing a load on the wind turbine induced by wind.

Figure 1:
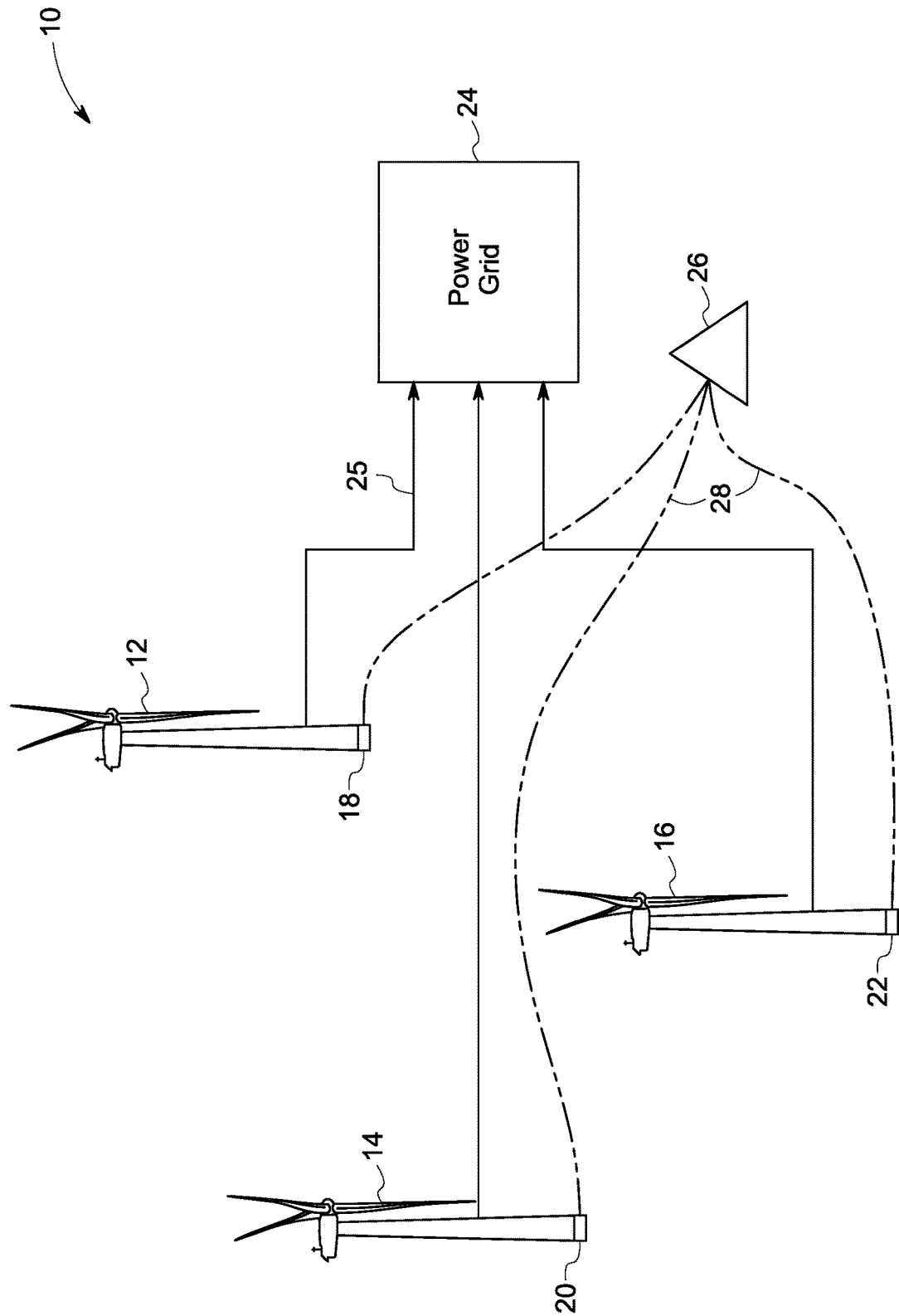
FIG. 1 is a schematic representation of a wind farm including wind turbines coupled to respective yaw backup systems in accordance with an embodiment of the invention.

FIG. 1 is a schematic representation of a wind farm 10 including wind turbines 12, 14, 16 coupled to respective yaw backup systems 18, 20, 22 in accordance with an embodiment of the invention. The wind farm 10 includes wind turbines 12, 14, 16 that generate electricity from wind. For understanding purposes, an exemplary wind farm 10 including three wind turbines 12, 14, 16 is depicted. However, there can be one or more wind turbines in the wind farm 10. The wind turbines 12, 14, 16 generate electricity and transmit the electricity to a power grid 24 via power lines 25. The wind farm 10 includes a distributed yaw backup system wherein each of the wind turbines 12, 14, 16 is coupled to a respective yaw backup system 18, 20, 22 that provides auxiliary power to a respective yaw motor (FIG. 2) and controls the yaw motor of the respective wind turbine 12, 14, 16 for changing a yaw angle of the respective wind turbines 12, 14, 16 during a grid loss condition to reduce a load induced by the wind. The yaw backup systems 18, 20, 22 of each of the wind turbines 12, 14, 16 may be communicatively coupled to a sensor 26 that measures wind speed and wind direction and transmits wind speed and the wind direction signals 28 to each of the wind turbines 12, 14, 16 over time. In one embodiment, the sensor 26 may include a plurality of sensors which may be situated at different locations in the wind farm 10 to measure the wind speeds and wind directions at different locations in the wind farm 10. In this embodiment, one or more of the sensors 26 may be communicatively coupled to each of the yaw backup systems 18, 20, 22. In a particular embodiment, the sensor 26 includes an anemometer.

Figure 2:
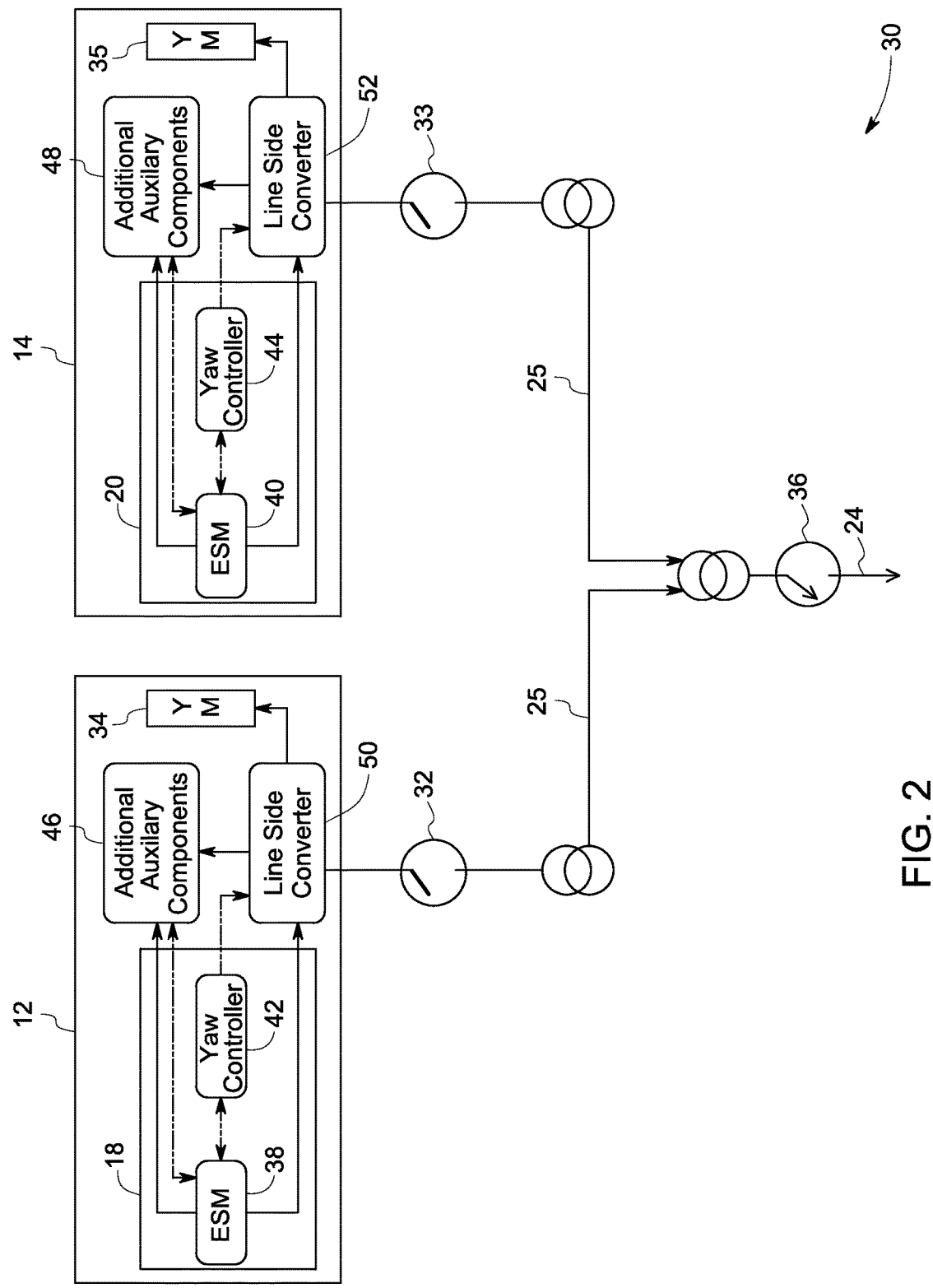
FIG. 2 is a schematic representation of a partial wind farm including two wind turbines coupled to respective yaw backup systems in a grid loss condition in accordance with an embodiment of the invention.

FIG. 2 is a schematic representation of a partial wind farm 30 including two wind turbines 12, 14 coupled to respective yaw backup systems 18, 20 in a grid loss condition in accordance with an embodiment of the invention. Each of the wind turbines 12, 14 is coupled through respective turbine circuit breakers 32, 33 to the respective power lines 25. The power lines 25 may be coupled to the power grid 24 through a common grid circuit breaker 36. During normal operation, the respective turbine circuit breakers 32, 33 are closed and the power is transmitted to the power grid 24 through the common grid circuit breaker 36 which is also closed and couples the wind turbines 12, 14 in the wind farm 30 to the power grid 24.

In situations of extreme wind conditions such as storms and hurricanes, the power grid 24 may disconnect itself from the wind farm 30 by switching the common grid circuit breaker 36 to an open state, and the wind turbines 12, 14 then temporarily suspend their operations. In one embodiment, the wind turbines 12, 14 may also disconnect from each other by switching the respective turbine circuit breakers 32, 33 to an open state. In such an embodiment where the turbine circuit breakers 32, 33 are in the open state, the yaw backup systems 18, 20 coupled to the respective wind turbines 12, 14 initiate operations and provide auxiliary power to the respective yaw motors 34, 35 for changing the yaw angle of the respective wind turbines 12, 14.

The yaw backup systems 18, 20 include energy storage elements 38, 40 that store auxiliary power for operating the yaw motors 34, 35 and yaw controllers 42, 44. The yaw controllers 42,44 may operate in a normal mode (that is not the subject of the present disclosure) to adjust yaw angles in addition to operating in the backup mode discussed herein to control the auxiliary power delivered to the yaw motors 34, 35 and thereby control the yaw angle of the respective wind turbines 12, 14. In one embodiment, each of the energy storage elements 38, 40 has the capacity to also provide auxiliary power to additional auxiliary wind turbine components 46, 48. In a specific embodiment, the additional auxiliary wind turbine components 46, 48 include pumps, heaters, fans, and a pitch motor. Each of the yaw controllers 42, 44 in the respective yaw backup systems 18, 20 are in communication with the sensor 26 (FIG. 1) and receive wind speed and wind direction signals (FIG. 1) over time from the sensor.

Initially, each yaw controller 42, 44 is preconfigured to include, for example, a load profile of the respective wind turbine 12, 14, location of the respective wind turbine 12, 14, a predefined lookup table, and a dead band limit for angular deviation of the respective wind turbine 12. 14. In one embodiment, the dead band limit for the angular deviation includes a range of about minus (−) eight degrees to about plus (+) eight degrees. The load profile of the respective wind turbine 12, 14 includes a load bearing capacity of wind turbine components such as the wind turbine blades and tower, for example.

During the extreme wind conditions, the yaw backup systems 18, 20 initiate the backup operations, and the yaw controllers 42, 44 determine a rate of change of wind speed and the rate of change of wind direction based on the wind speed and the wind direction signals 28 (FIG. 1) received from the sensors 26 (FIG. 1) by comparing the received wind speed and the wind direction with previously obtained wind speed and wind direction. The yaw controllers 42, 44 determine the tolerance level by referring to the predefined lookup table which provides a correlation between the rate of change of the wind speed, the rate of change of the wind direction and the tolerance level. In one embodiment, each tolerance level of the wind turbine comprises a range for a rate of change in the wind speed and a rate of change of the wind direction with respect to time that a wind turbine may withhold at a particular yaw angle without having any wear. Although factoring both rate of change of direction and rate of change of speed is recommended, in some embodiments, the tolerance level may be based on rate of change of direction alone or rate of change of direction combined with wind speed.

In one embodiment, the yaw backup systems 18, 20 are coupled to respective line side converters 50, 52 through a DC link, and the yaw controllers 42, 44 control a modulation index, also referred to as a duty cycle hereinafter, of the line side converters 50, 52 to control a frequency of delivery of power to the respective yaw motors 34, 35 based on the tolerance level. The yaw controllers 42, 44 change the duty cycle of the line side converters 50, 52 (or, in other words, the frequency at which adjustments are made to the yaw angles) based on a particular tolerance level to ensure that the yaw angles of the wind turbines always remain within the dead band limit of the wind turbines.

In one exemplary embodiment, the tolerance level may be obtained based on a wind speed rate of change, a wind direction rate of change, or a combination thereof. In this embodiment, at any particular interval of time, there may be three conditions which are used to determine the tolerance level. In a first condition wherein the rate of change of the wind speed is zero (constant wind speed) and the direction of wind is changing, the tolerance level is determined based on the wind direction rate of change and optionally on the wind speed. In a second condition wherein the wind speed is changing but the wind direction is constant in the given time interval, the tolerance level of the wind turbine will be computed based on the rate of change of the wind speed. In a third condition wherein the wind speed and the wind direction are both changing, the tolerance level will be determined based on the combination of the rate of change of the wind speed and the rate of change of wind direction. In this embodiment, the process of determining the tolerance level is repeated over time, and the yaw controllers 42, 44 alter the tolerance level of the respective wind turbines 12, 14 (and thus the frequency of yaw angle adjustments) based on the wind speed and the wind direction signals received over time.

The yaw motors 34, 35 operate based on the voltage provided by the respective line side converters 50, 52 to change the yaw angles of the respective wind turbines 12, 14. Based on the tolerance level, the yaw controllers 42, 44 compute a required change in the yaw angle within a respective interval of time to reduce the load on the respective wind turbines 12, 14. The yaw controllers 42, 44 further determine a respective duty cycle based on the tolerance level wherein the duty cycle represents a predefined frequency of adjustment of the yaw angle and governs the number of events in which the line side converters 50, 52 are switched on to provide power to the yaw motors 34, 35 for changing the yaw angles in a given period of time. The yaw controllers 42, 44 further determine a duration for which the yaw motors 34, 35 needs to be operated for each of the event of the duty cycle based on the change required in the yaw angle and an angular torque capability of the yaw motors 34, 35. In one example, the yaw motors 34, 35 have an angular torque of zero point three (0.3) degrees change of the yaw angle per second. The yaw controllers 42, 44 apply the respective duty cycles and control the frequency (number of events) and durations for which power is provided to the respective yaw motors 34, 35 for changing the yaw angle of the wind turbines 12, 14. An example of changing the duty cycles based on tolerance level by the yaw controllers 42, 44 is described below with respect to FIG. 3.

Figure 3:
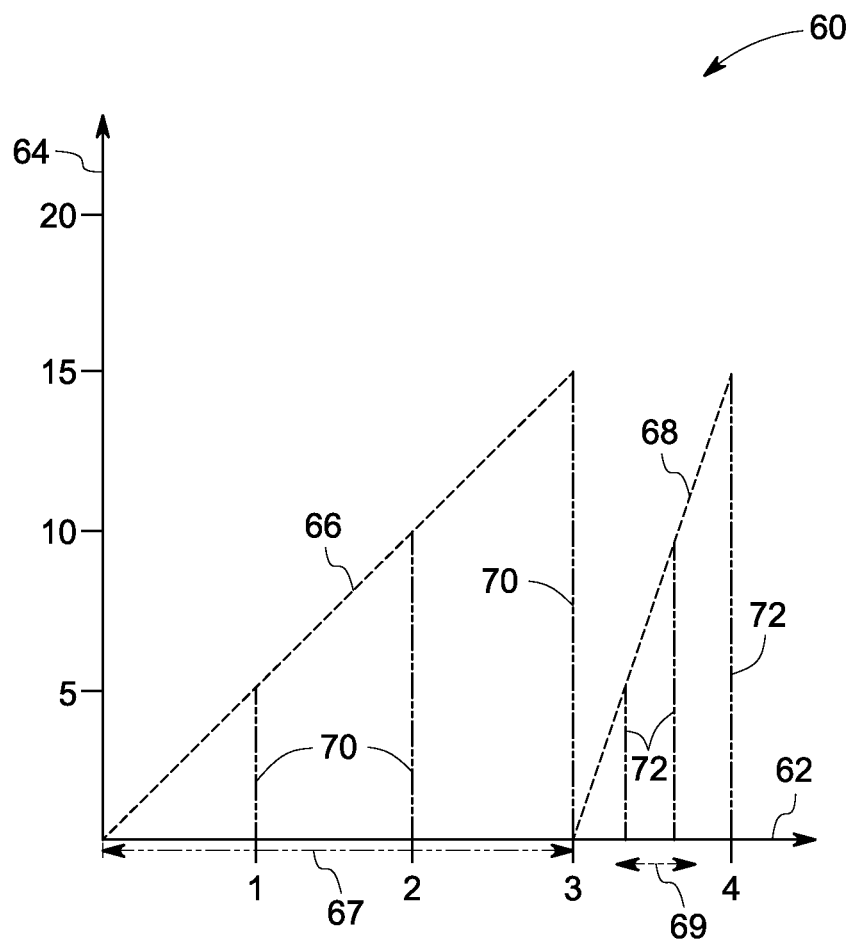
FIG. 3 is a graphical representation of a rate of change in the wind direction with respect to time.

FIG. 3 is an exemplary graphical representation of a rate of change in the wind direction with respect to time. The rates of change are used to determine duty cycles that may be applied by the yaw controller in accordance with an embodiment of the invention relating to wind direction. The X-axis 62 represents time in hours, and the Y-axis 64 represents a change in the wind direction in degrees. In this example, the dead band limit of the wind turbine is minus (−) eight degrees to plus (+) eight degrees such that the difference between the yaw angle and the wind direction should not exceed the dead band limit to avoid wear to the wind turbine. The yaw controller alters the tolerance level of the wind turbine in such a way that the difference between the yaw angle and the wind direction remains within the dead band limit. Curve 66 represents a rate of change in the wind direction in a first time interval represented by portion 67 where the change of fifteen degrees in the wind direction happens over a first period of three hours, and curve 68 represents a rate of change in the wind direction in a subsequent second time interval represented by portion 69 where the change of fifteen degrees in the wind direction happens over a subsequent period of one hour. Therefore, if a first tolerance level is associated with a range from zero degrees to five degrees of wind change in the wind direction per hour, then during the first time interval the first tolerance level would be used. Similarly, if a second tolerance level is associated with a range that is greater than five degrees of wind change in the wind direction per hour, then during the second time interval the second tolerance level would be used. For purposes of illustration and simplicity, the rate of change in wind direction for the second time interval is shown to start from zero degrees as the second time interval is distinct from the first time interval. However, in other embodiments, the time intervals need not be discrete. Additionally, in other embodiments, additional and/or different tolerance levels may be used.

As described above, the yaw controller implements a duty cycle for each of the respective tolerance levels. In one example, under the first tolerance level the yaw controller applies a first duty cycle with a frequency of one event per hour for changing the yaw angle. Assuming that the rate of change of wind direction is fixed at five degrees per hour and the first duty cycle is executed by the yaw controller, the yaw controller will initiate the operation of the line side converter once in one hour. Additionally, the yaw controller will compute the change in the yaw angle that is required by the wind turbine to remain in the dead band limit. Therefore, in this particular case, the required change in yaw angle per duty cycle can be calculated as five degrees per duty cycle as the rate of change of wind direction is fixed at five degrees per hour and there is only one event of providing power to the line side converters 50, 52 per hour. Therefore, so long as the rate of change of wind direction is under the first tolerance level of five degrees per hour, the yaw controller will apply the first duty cycle and change the yaw angle once in an hour. Thus, yaw controller enables the energy storage element to provide power to the yaw motor to change the yaw angle with a rate of five degrees per hour as represented by curve 70 (first duty cycle). Once the rate of change of wind direction increases above five degrees per hour as shown in the second interval, the yaw controller alters the tolerance level of the wind turbine to the second tolerance level such that the time between the events of providing power to the line side converters may be shorter based on the second duty cycle as represented by curves 72. For the 15 degree per hour example, adjusting every hour would not result in the operation being maintained within the deadband limit. In the example of FIG. 3, the adjustments occur every 20 minutes.

In another embodiment, the yaw controller will not provide power to the yaw motor until it appears that the difference between the yaw angle and the wind direction is close to being within the dead band limit. For example, when the rate of change of wind direction is fixed at five degrees per hour, the wind direction changes one degree in every twelve minutes. Therefore, after ninety six minutes the difference between the yaw angle and the wind direction would reach the eight degree dead band limit. The yaw controller can either (a) control the delivery of power to the yaw motor such that the yaw angle changes by one degree to remain in the dead band limit (such as by a first duty cycle to provide power to the yaw motor every twelve minutes after ninety six minutes are over), or (b) control the delivery of power to the yaw motor for more than one degree such that a longer frequency than 12 minutes is used. Similarly, during the second interval, the yaw controller may apply a second duty cycle. Assuming that the rate of change of wind direction is fixed at fifteen degrees per hour, it can be said that the wind direction is changing at one degree per four minutes. Therefore, the second duty cycle may include providing enough power to the yaw motor for a one degree adjustment at the thirty two minute mark and every four minutes thereafter to remain in the dead band limit. Or, if desired, the adjustment and time interval between adjustments may be larger.

As discussed above, the tolerance level along with associated duty cycles can additionally be determined based on wind speed or rate of change of wind speed in combination with the rate of change of wind direction or in some cases, such as wherein wind direction is constant, may be determined by rate of change of wind speed alone. Altering the tolerance levels and applying different duty cycles helps the wind turbine to mitigate for the change in wind conditions while using less auxiliary energy than in conventional approaches. As used herein, the terms "auxiliary energy" and "auxiliary power" are used interchangeably. Thus, the time period for which the wind turbine can operate the yaw motor with a given auxiliary power source during grid loss conditions such as storms and hurricanes may be increased or a smaller energy storage medium may be used to reduce the cost of wind power. The present invention may be used to provide power to additional auxiliary wind turbine components for longer durations and results in less wear and tear of the wind turbine components.

Figure 4:
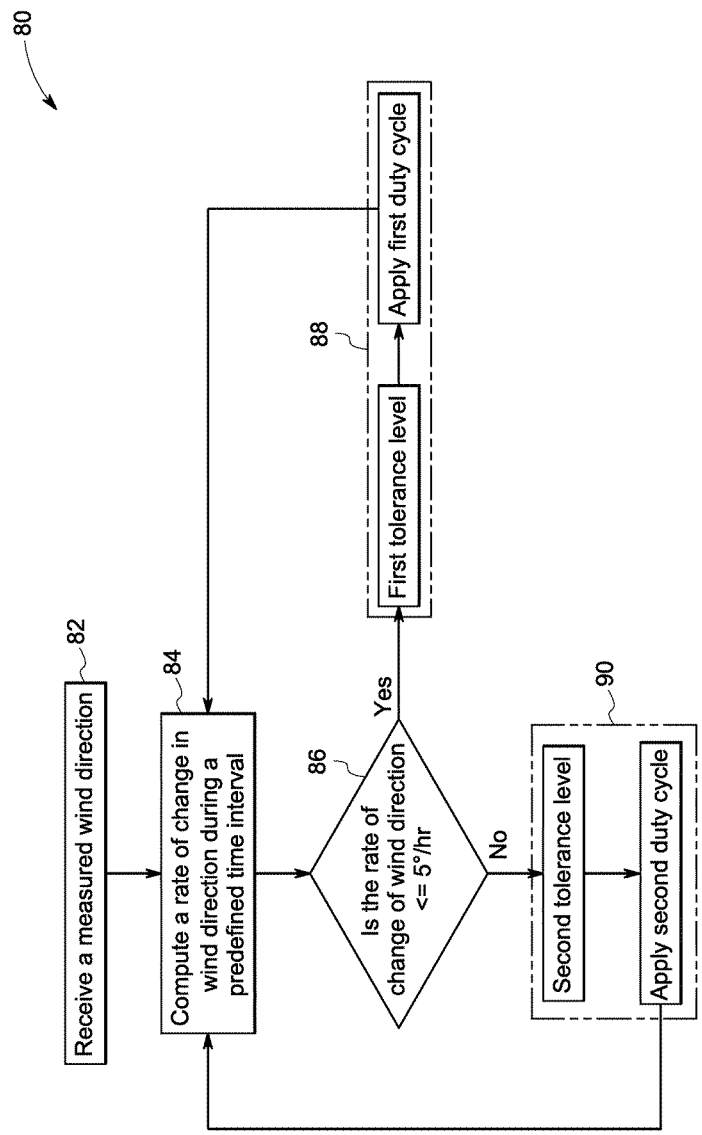
FIG. 4 is a flow chart representing steps involved in an exemplary method for applying the first duty cycle and the second duty cycle in the yaw backup system as described in FIG. 3 above in accordance with an embodiment of the invention.

FIG. 4 is a flow chart representing the steps involved in exemplary method 80 for applying the first duty cycle and the second duty cycle in the yaw backup system as described in FIG. 3 above in accordance with an embodiment of the invention. The yaw controller receives a measured wind direction from the sensor over time in step 82. The yaw controller computes a rate of change in the wind direction during a time interval (such as, fifteen minutes, for example) in step 84 and identifies a tolerance level. The yaw controller compares the computed rate of change with the different tolerance level which in this case is the first tolerance level and the second tolerance level in step 86. If the rate of change in the wind direction is below five degrees with respect to the wind direction measured during a past hour, the yaw controller applies the first duty cycle as the rate of change of the wind direction falls within the range of the first tolerance level and continues to operate under the first duty cycle till the rate of change in wind direction does not increase more than the first tolerance level in step 88. However, if the rate of change in the wind direction increases is above five degrees with respect to the wind direction measured during the past hour, the yaw controller changes its tolerance level from the first tolerance level to the second tolerance level and executes the second duty cycle as the rate of change is within the second tolerance level of the wind turbine in step 90.

Figure 5:
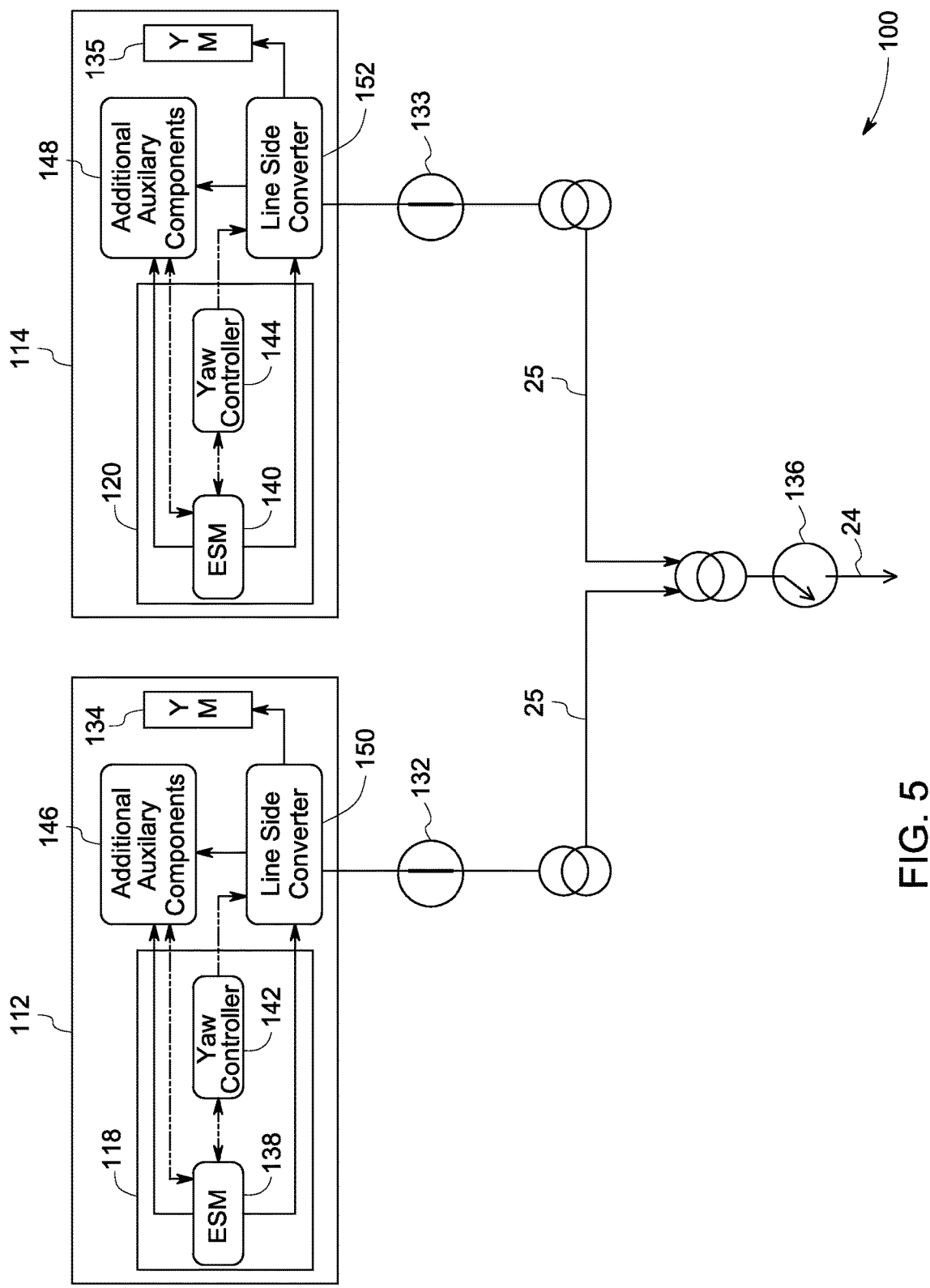
FIG. 5 is a schematic representation of a partial wind farm including two wind turbines coupled to respective yaw backup systems in a grid loss conditions and forming a micro grid wherein the two wind turbines are coupled to each other in accordance with an embodiment of the invention.

FIG. 5 is a schematic representation of a partial wind farm 100 including a first wind turbine 112 and a second wind turbine 114 coupled to a first yaw backup system 118 and a second yaw backup system 120 in a grid loss conditions. A micro grid is formed wherein the first wind turbine 112 and the second wind turbine 114 are coupled to each other in accordance with an embodiment of the invention. In one embodiment, during the grid loss condition, the common grid circuit breaker 136 is in the open state and the turbine circuit breakers 132, 133 of the first wind turbine 112 and the second wind turbine 114 are in a closed state which results in coupling of the first yaw backup system 118 and the second yaw backup system 120. In such an embodiment, a first yaw motor 134 of the first wind turbine 112 is able to operate based on the power received from a second energy storage element 140 of the second wind turbine 114.

The first yaw backup system 118 includes a first yaw controller 142, a first line side converter 150 and the second yaw backup system 120 includes a second yaw controller 144 and a second line side converter 152. The first yaw controller 142 and the second yaw controller 144 receive the wind speed and the wind direction signals (FIG. 1) over time from the sensor (FIG. 1) and alter the tolerance level of the respective wind turbines 112, 114 based on the changes in the wind speed and direction signals received from the sensor. The first yaw controller 142 and the second yaw controller 144 further compute an auxiliary power level of the first energy storage element 138 and the second energy storage element 140 and compare the respective computed auxiliary power level with a predefined auxiliary power level of the respective energy storage elements 138, 140. In one embodiment, the first energy storage element 138 and the second energy storage element 140 also provide power to first auxiliary wind turbine components 146 and the second auxiliary wind turbine components 148 of the first wind turbine 112 and the second wind turbine 114 respectively. In a situation where the computed auxiliary power level of one of the energy storage mediums for example, the first energy storage medium 138 is less than the predefined level of the auxiliary power, the first yaw controller 142 communicates with the second yaw controller 144 and requests the second yaw controller 144 to allow the second energy storage medium 140 to provide power through the second line side converter 152 to the first line side converter 150 which is in turn controlled by yaw controller 142 to provide power to the first yaw motor 134 for changing the yaw angle of the first wind turbine 112. The aforementioned description is discussed with respect to two wind turbines for the simplicity of understanding however, the same can be suitably modified to operate with N number of wind turbines in a wind farm.

Figure 6:
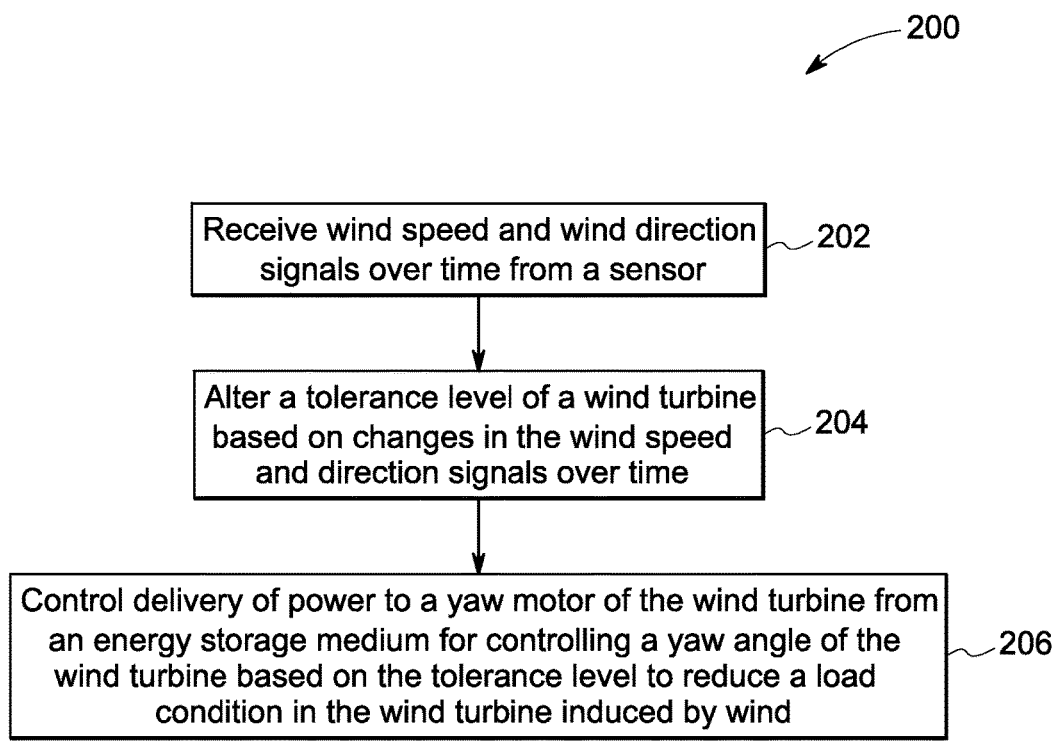
FIG. 6 is a flow chart representing the steps involved in a method for providing yaw backup power to yaw motors of respective wind turbines in a wind farm in a grid loss condition in accordance with an embodiment of the invention.

FIG. 6 is a flow chart representing the steps involved in a method 200 for providing yaw backup power to yaw motors of respective wind turbines in a wind farm in a grid loss condition in accordance with an embodiment of the invention. The method 200 includes receiving wind speed and wind direction signals over time from a sensor in step 202. In one embodiment, receiving wind speed and wind direction signals over time from a sensor comprises receiving wind direction signals over time from an anemometer. The method also includes altering a tolerance level of a wind turbine based on changes in the wind direction signals over time in step 204. In one embodiment, the method further comprises a step of receiving wind speed signals from the sensor, and wherein the step of altering the tolerance level is additionally based on the wind speeds or changes in the wind speed signals over time. The method further includes controlling delivery of power to a yaw motor of the wind turbine from an energy storage medium for controlling a yaw angle of the wind turbine based on the tolerance level to reduce a load condition in the wind turbine induced by wind in step 206. In one embodiment, controlling the delivery of power to the yaw motor comprises comparing the computed auxiliary power level with a predefined auxiliary power level of the energy storage element coupled to the respective wind turbine. In another embodiment, controlling the delivery of power to the yaw motor comprises controlling the delivery of power from the energy storage medium coupled to a different wind turbine in a wind farm if the computed auxiliary power level of the respective energy storage medium is less than the predefined auxiliary power level. In an exemplary embodiment, controlling the delivery of power to the yaw motor comprises changing a duty cycle of a line side converter of the wind turbine to maintain the yaw angle within a dead band limit of the wind turbine. In a more specific embodiment, maintaining the yaw angle within the dead band limit comprises maintaining a difference between the yaw angle and the wind direction between a range of about plus (+) eight degrees to about minus (−) eight degrees.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A yaw backup system comprising:
an energy storage medium for storing auxiliary power;
a yaw controller for coordinating delivery of power from the energy storage medium to a yaw motor for controlling a yaw angle of a wind turbine during grid loss conditions by executing steps of:
  receiving wind direction signals over time from a sensor;
  determining a wind direction rate of change based on the wind direction signals;
  selecting a tolerance level from a plurality of predetermined and stored tolerance levels, wherein the selected tolerance level correlates to the determined wind direction rate of change with respect to time, the tolerance level comprising a duty cycle at which power is supplied to the yaw motor for a defined range of wind direction rate changes;
  switching to a different tolerance level when the wind direction rate of change exceeds the defined range for the selected tolerance level; and
  controlling the delivery of power from the energy storage medium to the yaw motor based on one of the selected tolerance level or the different tolerance level to maintain the yaw angle in a predefined angular dead band limit relative to wind direction for reducing a load on the wind turbine induced by wind.

2. The yaw backup system of claim 1, wherein the yaw controller is further configured for executing a step of receiving wind speed signals from the sensor and determining a wind speed rate of change based on the wind speed signals, and wherein the step of switching to a different tolerance level is additionally based on the wind speed rate of change.

3. The yaw backup system of claim 1, wherein the sensor comprises an anemometer.

4. The yaw backup system of claim 1, further comprising a line side converter electrically coupled to the energy storage medium.

5. The yaw backup system of claim 4, wherein the yaw controller is further configured for coordinating delivery of power from the energy storage medium to the line side converter during grid loss conditions.

6. The yaw backup system of claim 1, wherein the energy storage medium comprises a battery.

7. The yaw backup system of claim 1, wherein the energy storage medium has capacity for providing power to additional auxiliary components of the wind turbine.

8. A wind farm comprising:
a plurality of wind turbines for generating wind power and transmitting the wind power to a power grid, where the wind turbines are electrically coupled to each other;
a plurality of yaw motors, each yaw motor for controlling a yaw angle of a respective wind turbine of the plurality of wind turbines
yaw backup systems coupled to the respective wind turbines in the wind farm for controlling delivery of power to the respective yaw motors to control the respective yaw angles of the respective wind turbines during a grid loss condition, wherein each of the yaw backup systems comprises:
an energy storage element for storing auxiliary power;
a yaw controller for executing the steps of:
  receiving wind direction signals over time from a sensor;
  determining a wind direction rate of change based on the wind direction signals;
  selecting a tolerance level from a plurality of predetermined and stored tolerance levels, wherein the selected tolerance level correlates to the determined wind direction rate of change with respect to time, the tolerance level comprising a duty cycle at which power is supplied to the yaw motor for a defined range of wind direction rate changes;
  switching to a different tolerance level when the wind direction rate of change exceeds the defined range for the selected tolerance level;
  computing an auxiliary power level of the energy storage element coupled to the respective wind turbine;
  comparing the computed auxiliary power level with a predefined auxiliary power level of the energy storage element coupled to the respective wind turbine; and
  controlling the delivery of power from the energy storage element to a respective yaw motor for maintaining the yaw angle of the respective wind turbine in a predefined angular dead band limit relative to wind direction for reducing a load on the respective wind turbine induced by wind, and
wherein the yaw controller controls the delivery of power from the energy storage element of the respective wind turbine if the computed auxiliary power level is greater than the predefined auxiliary power level for the respective wind turbine, or from an energy storage element of a different wind turbine coupled to the respective wind turbine if the computed auxiliary power level is less than the predefined auxiliary power level for the respective wind turbine based on the tolerance level to control the yaw angle of the respective wind turbine.

9. The wind farm of claim 8, wherein each sensor comprises an anemometer.

10. The wind farm of claim 8, wherein each of the yaw backup systems further comprises a line side converter electrically coupled to the respective energy storage element.

11. The wind farm of claim 10, wherein each of the yaw controllers is further configured for coordinating delivery of power from the energy storage element to the line side converter during the grid loss condition.

12. The wind farm of claim 8, wherein each energy storage element comprises a battery.

13. The wind farm of claim 8, wherein each yaw controller is further configured for executing a step of receiving wind speed signals from the sensor, and wherein the step of switching to the different tolerance level is additionally based on the wind speed signals or changes in the wind speed signals over time.

* * * * *